(12) United States Patent
Jandric et al.

(10) Patent No.: US 9,304,253 B2
(45) Date of Patent: Apr. 5, 2016

(54) NEAR-FIELD TRANSDUCER WITH FLARE PEG

(71) Applicant: Seagate Technology LLC, Cupertino, CA (US)

(72) Inventors: Zoran Jandric, St. Louis Park, MN (US); Lina Cao, Edina, MN (US); Werner Scholz, Edina, MN (US); James Gary Wessel, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/789,272

(22) Filed: Mar. 7, 2013

(65) Prior Publication Data

US 2014/0254336 A1    Sep. 11, 2014

(51) Int. Cl.
*G11B 13/04* (2006.01)
*G02B 6/122* (2006.01)
*G11B 5/31* (2006.01)
*G11B 5/60* (2006.01)
*G11B 5/00* (2006.01)

(52) U.S. Cl.
CPC .............. *G02B 6/1226* (2013.01); *G11B 5/314* (2013.01); *G11B 5/6088* (2013.01); *G11B 2005/0021* (2013.01)

(58) Field of Classification Search
CPC ........... G11B 2005/0021; G11B 5/314; G11B 5/6088; G11B 2005/0005; G11B 5/1278; G11B 5/3116; G11B 5/3173; G02B 6/1226
USPC ............ 360/125.31, 235.4; 369/13.32, 13.33, 369/13.14, 13.24, 300
See application file for complete search history.

(56) References Cited

U.S. PATENT DOCUMENTS

| 4,240,869 | A | 12/1980 | Diepers |
| 6,080,272 | A | 6/2000 | Langley et al. |
| 6,531,069 | B1 | 3/2003 | Srivastava et al. |
| 8,159,769 | B2 | 4/2012 | Batra et al. |
| 8,248,891 | B2 | 8/2012 | Lee et al. |
| 8,279,719 | B1 | 10/2012 | Hu et al. |
| 8,286,329 | B1 | 10/2012 | Zhao et al. |
| 8,351,151 | B2 | 1/2013 | Katine et al. |
| 2006/0024945 | A1 | 2/2006 | Kim et al. |

(Continued)

OTHER PUBLICATIONS

Challener et al. "Heat-Assisted Magnetic Recording by a Near-Field Transducer with Efficient Optical Energy Transfer." Nature Photonics. vol. 3. Apr. 2009. pp. 220-224.

(Continued)

*Primary Examiner* — Dionne H Pendleton
(74) *Attorney, Agent, or Firm* — Hollingsworth Davis, LLC

(57) ABSTRACT

Disclosed are plasmonic near-field transducers that are useful in heat-assisted magnetic recording. The disclosed plasmonic near-field transducers have an enlarged region and a flared region. In some embodiments the disclosed plasmonic near-field transducer can also include a peg region. The flared region can act as a heat sink and can lower the thermal resistance of the peg region of the near-field transducer, thus reducing its temperature. Also disclosed are methods that include delivering light to a magnetic transducer region via a waveguide, receiving the light at a plasmonic near-field transducer having an output end and disposed in proximity to the magnetic transducer region, and delivering a surface plasmon-enhanced near-field radiation pattern proximate the output end of the plasmonic transducer in response to receiving the light.

17 Claims, 7 Drawing Sheets

(56) References Cited

U.S. PATENT DOCUMENTS

| | | |
|---|---|---|
| 2009/0325082 A1 | 12/2009 | Ryu |
| 2010/0074063 A1* | 3/2010 | Peng et al. ............... 369/13.32 |
| 2010/0271910 A1* | 10/2010 | Boutaghou ............... 369/13.33 |
| 2011/0170381 A1* | 7/2011 | Matsumoto ............... 369/13.33 |
| 2011/0228418 A1 | 9/2011 | Sasaki et al. |
| 2012/0039155 A1 | 2/2012 | Peng et al. |
| 2012/0163139 A1* | 6/2012 | Vavra et al. ............... 369/13.33 |
| 2012/0314549 A1 | 12/2012 | Lee et al. |
| 2014/0233361 A1* | 8/2014 | Shimazawa ............... 369/13.32 |

OTHER PUBLICATIONS

File History for U.S. Appl. No. 13/789,252.

* cited by examiner

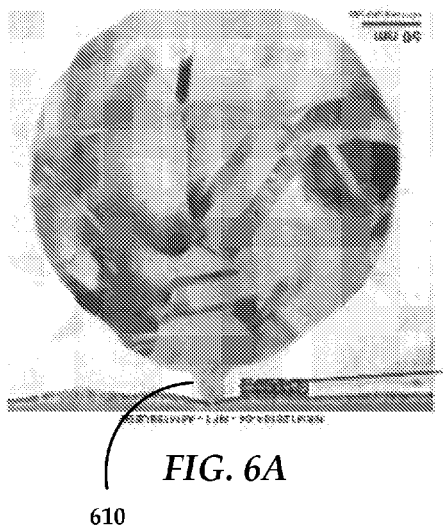 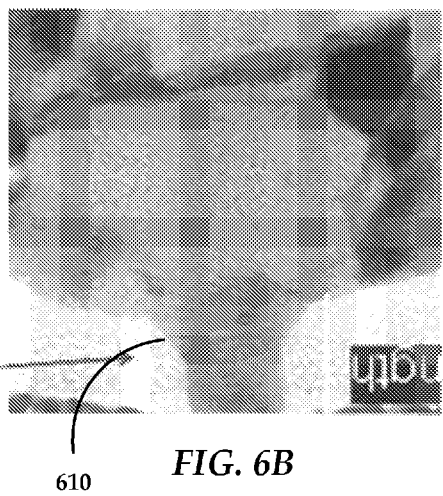
FIG. 6A   610   FIG. 6B
610

| Length of Flared Region | No Flare | Flare 10 nm | Flare 20 nm |
|---|---|---|---|
| 10 nm | 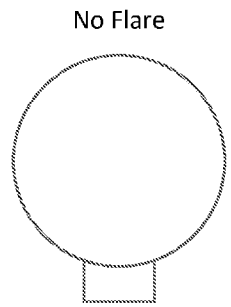 Fig. 7A | 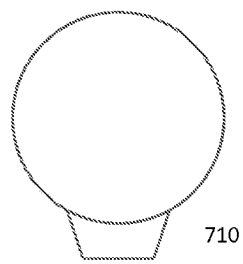 Fig. 7B | 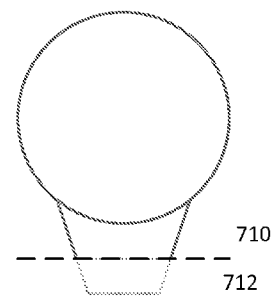 Fig. 7C |
| 20 nm | 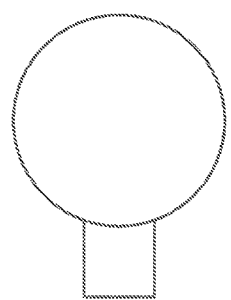 Fig. 7D | 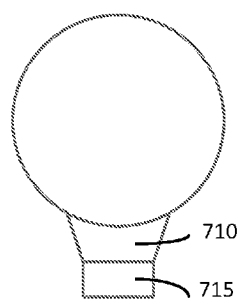 Fig. 7E | 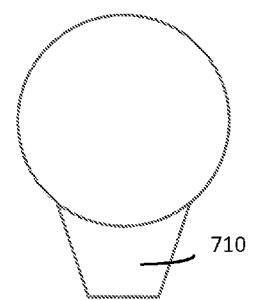 Fig. 7F |
| 30 nm | 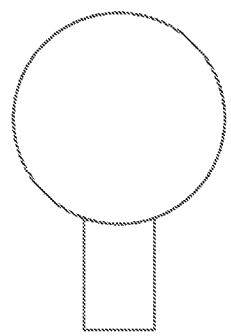 Fig. 7G | 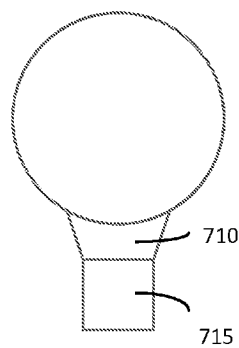 Fig. 7H | 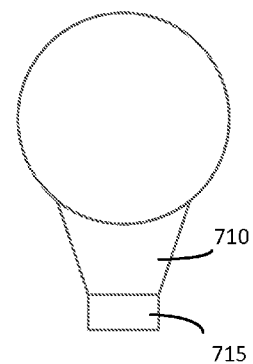 Fig. 7I |

NEAR-FIELD TRANSDUCER WITH FLARE PEG

SUMMARY

Various embodiments disclosed herein are generally directed to methods, systems, and apparatuses that facilitate coupling a laser diode to a magnetic writer that includes a magnetic write head. The methods, systems and apparatuses include a plasmonic near-field transducer for heat-assisted magnetic recording (HAMR). Typical near-field transducers can generate a large amount of heat in their writing tip. Disclosed are solutions to this heat buildup.

In one aspect, an apparatus is disclosed that includes a waveguide shaped to direct light to a focal point and a plasmonic near-field transducer positioned adjacent to the focal point. The plasmonic near-field transducer includes an enlarged region at an input end and a flared region that narrows towards an output end. The flared region is in contact with the enlarged region. The plasmonic near-field transducer, optionally, comprises a peg region that extends from the flared region to the output end. The plasmonic near-field transducer has a break point located on the enlarged region at a point closest to the output end of the flared region. The output end is adjacent to an air-bearing surface.

In another aspect, a method is disclosed that includes delivering light to a magnetic transducer region via a waveguide, receiving the light at a plasmonic near-field transducer having an output end and disposed in proximity to the magnetic transducer region, and delivering a surface plasmon-enhanced near-field radiation pattern proximate the output end of the plasmonic transducer in response to receiving the light. The near-field transducer includes an enlarged region at an input end and a flared region in contact with the enlarged region at a break point. The near-field transducer, optionally, can include a peg having an end in contact with the enlarged region at a flare angle and an output end adjacent to an air-bearing surface.

The disclosed plasmonic near-field transducers are useful in heat-assisted magnetic recording. The plasmonic near-field transducers have an enlarged region and a peg region. The peg region includes a flared region in proximity to an air-bearing surface above a recording medium. The flared region can act as a heat sink and can lower the thermal resistance of the peg region of the near-field transducer, thus reducing its temperature.

In this disclosure:

"break point" refers to the point on the enlarged portion of a disclosed near-field transducer that is in contact with the flared region of the disclosed near-field transducer and is closest to the output end of the disclosed near-field transducer.

The above summary is not intended to describe each disclosed embodiment or every implementation of the present disclosure. The figures and the detailed description below more particularly exemplify illustrative embodiments

BRIEF DESCRIPTION OF THE DRAWINGS

Throughout the specification reference is made to the appended drawings, where like reference numerals designate like elements, and wherein:

FIGS. 6A and 6B are photomicrographs of two different magnifications of a disclosed near-field transducer with a flared peg.

FIG. 7A-I are a series of NFT designs with varying flares and peg regions used.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
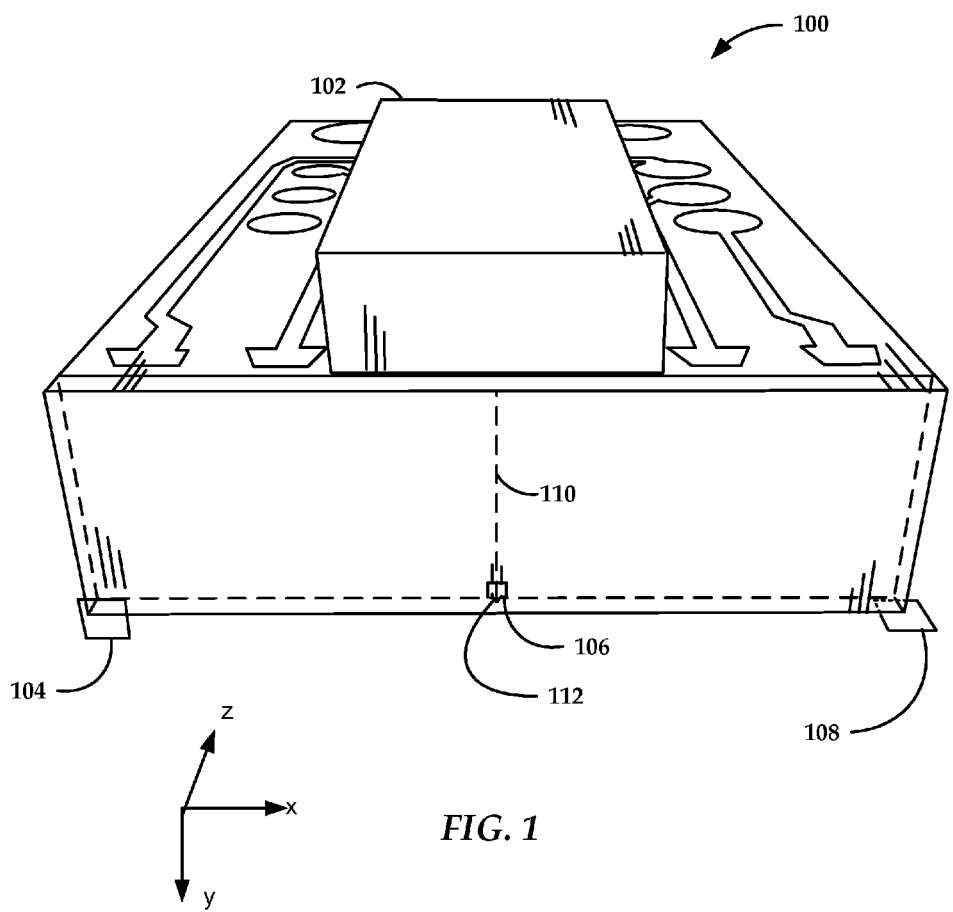
FIG. 1 is a perspective view of a hard drive slider that includes a disclosed near-field transducer.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

One way to achieve a tiny confined hot spot is to use an optical near-field transducer (NFT), such as a plasmonic optical antenna or an aperture, located near an air bearing surface of a hard drive slider. Light may be launched from a light source (e.g., a laser diode) into optics integrated into a slider. An example of such integrated optics includes a waveguide formed from core and cladding layers with high contrast between respective refractive indices. Light propagating in the waveguide may be directed to an optical focusing element, such as a planar solid immersion mirror (PSIM). The PSIM may concentrate the energy into a NFT. The NFT causes the energy to be delivered to the media in a very small spot.

A waveguide, NFT, and PSIM are examples of integrated optical devices that are formed within the slider. The field of integrated optics generally relates to the construction of optics devices on substrates, sometimes in combination with electronic components, to produce functional systems or subsystems. For example, light may be transferred between components via waveguides that are built up on a substrate using layer deposition techniques. These waveguides may be formed as a layer of materials, with a middle core layer having a relatively high refractive index, and top/bottom cladding layers of relatively low refractive index. Other optical components may be formed in similar fashion, including the NFT and PSIM discussed above.

In a HAMR slider, light is launched into these integrated optics components from a light source such as a laser diode. One way to launch light into a slider is from an externally mounted laser via an optical waveguide or grating coupler fabricated in a slider. Another way is to place a laser light source, such as a laser diode, into the slider, called laser-in-slider (LiS) light delivery. In laser-in-slider configurations, light is launched from the emitting facet of a laser diode into an optical waveguide. Laser-in-slider light delivery can be integrated at a wafer level and may be suitable for mass production.

FIG. 1 is a perspective view of a hard drive slider that includes a disclosed plamonic near-field transducer (NFT). HAMR slider 100 includes laser diode 102 located on top of HAMR slider 100 proximate to trailing edge surface 104 of HAMR slider 100. Laser diode 102 delivers light proximate to read/write head 106, which has one edge on air bearing surface 108 of HAMR slider 100. Air bearing surface 108 is held proximate to a moving media surface (not shown) during device operation.

Laser diode 102 provides electromagnetic energy to heat the media at a point near to read/write head 106. Optical coupling components, such as a waveguide 110, are formed integrally within HAMR slider 100 to deliver light from laser diode 102 to the media. In particular, local waveguide 110 and NFT 112 may be located proximate read/write head 106 to provide local heating of the media during write operations. Laser diode 102 in this example may be an integral, edge-emitting device, although it will be appreciated that waveguide 110 and NFT 112 may be used with any light source and light delivery mechanisms. For example, a surface emitting laser (SEL) may be used instead of an edge firing laser.

While the example in FIG. 1 shows laser diode 102 integrated with HAMR slider 100, NFT 112 discussed herein may be useful in any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to slider-integrated waveguide 110 which energizes NFT 112.

A HAMR device utilizes the types of optical devices described above to heat a magnetic recording media (e.g., hard disc) in order to overcome superparamagnetic effects that limit the areal data density of typical magnetic media. When writing to a HAMR medium, the light can be concentrated into a small hotspot over the track where writing takes place. The light propagates through waveguide 110 where it is coupled to NFT 112 either directly from the waveguide or by way of a focusing element. Other optical elements, such as couplers, mirrors, prisms, etc., may also be formed integral to the slider. The optical elements used in HAMR recording heads are generally referred to as integrated optics devices.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, NFT 112 is employed to create a hotspot on the media.

NFT 112 is a near-field optics device designed to reach local surface plasmon resonance at a designed wavelength. A waveguide and/or other optical element concentrates light on a transducer region (e.g., focal point) where NFT 112 is located. NFT 112 is designed to achieve surface plasmon resonance in response to this concentration of light. At resonance, a high electric field surrounds NFT 112 due to the collective oscillations of electrons at the metal surface. Part of this field will tunnel into a storage medium and get absorbed, thereby raising the temperature of a spot on the media as it being recorded. NFTs generally have a surface that is made of a material that supports surface plasmons such as aluminum, gold, silver, or copper. They may also have other materials but they must have a material that supports surface plasmons on their outer surface.

Figure 2:
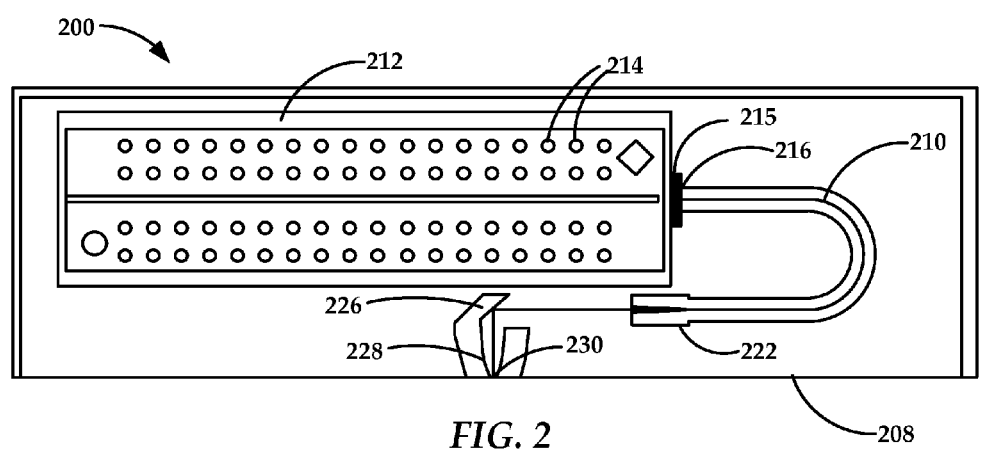
FIG. 2 is a more detailed front view of the hard drive slider shown in FIG. 1.

FIG. 2 is a front view of a disclosed apparatus showing electrical and optical interface features of slider assembly 200 that mates with an edge-emitting laser diode (e.g., laser diode 102 in FIG. 1). Cavity 212, solder bumps 214, waveguide input 216, waveguide 210, and air bearing surface 208 seen here, were previously illustrated in FIG. 1. Solder bumps 214 on slider assembly 200 are configured to interface with the plurality of solder pads on the lower surface of a laser diode. The laser diode may include an output facet on one end that launches light into waveguide input 216 of waveguide 210 for delivery to the recording media. Integrated optics associated with light delivery may include coupling elements, beam expanders 222, collimators, focusing elements 226, such as PSIM, concentrating elements, 228 such as a plasmonic near-field transducer focused adjacent to focal point 230. Furthermore, located at the edge of cavity 212 between the laser diode and waveguide input 216 is gap 215. The size of gap 215 may depend on the alignment of the laser diode to cavity 212, but a typical size may be from about 0.25-1.0 μm and up to about 10 μm. Gap 215 may also have an aspect ratio of about 5 to 6. The aspect ratio is the ratio between depth of cavity 212 and the width of cavity 212.

The present disclosure relates to a system and apparatus comprising a plasmonic near-field transducer that includes a flared peg region, as well as, a method for delivering light comprising a near-field transducer with a flared peg region. In one aspect a disclosed apparatus comprises waveguide shaped to direct light to a focal point (e.g, 230 from FIG. 2), and a plasmonic near-field transducer positioned adjacent to the focal point. The near-field transducer comprises an enlarged region at an input end, and a flared region in contact with the enlarged region at a break point. A peg region comprises the flared region and has an output end adjacent to an air-bearing surface (ABS). The flared region further comprises a flare angle ($\alpha$), wherein the flare angle ($\alpha$) is the angle between a reference position normal to the air-bearing surface and an outside edge of the flare region (as shown on FIG. 4A). In addition, the peg may also include a narrow region disposed at its output end and adjacent to an air-bearing surface.

In another aspect, a disclosed system comprises means for delivering light to a magnetic transducer region. A plasmonic near-field transducer disposed in proximity to the magnetic transducer region has means for receiving the light. The plasmonic near-field transducer has means for providing a surface plasmon-enhanced near-field radiation pattern proximate an output end of the plasmonic near-field transducer in response to receiving the light. The plasmonic near-field transducer is positioned adjacent to a focal point. In some cases the focal point may be in reference to a location on a magnetic media. The system may comprise means for recording to a magnetic media proximate the output end (i.e. the focal point) of the plasmonic near-field transducer in response to receiving the light. The near-field transducer may also comprise an enlarged region at an input end, and a flared region in contact with the enlarged region at a break point. The flared region further comprises a flare angle ($\alpha$). The flare angle ($\alpha$) is the angle that the edge of the flared region makes with either the edge of a peg, if present, or a line normal to the direction of the electrons emanating from the output end towards the air-bearing surface. In addition, the flared region may also include a peg region disposed at the end of the flared region, the peg region having an output end adjacent to an air-bearing surface.

Figure 3:
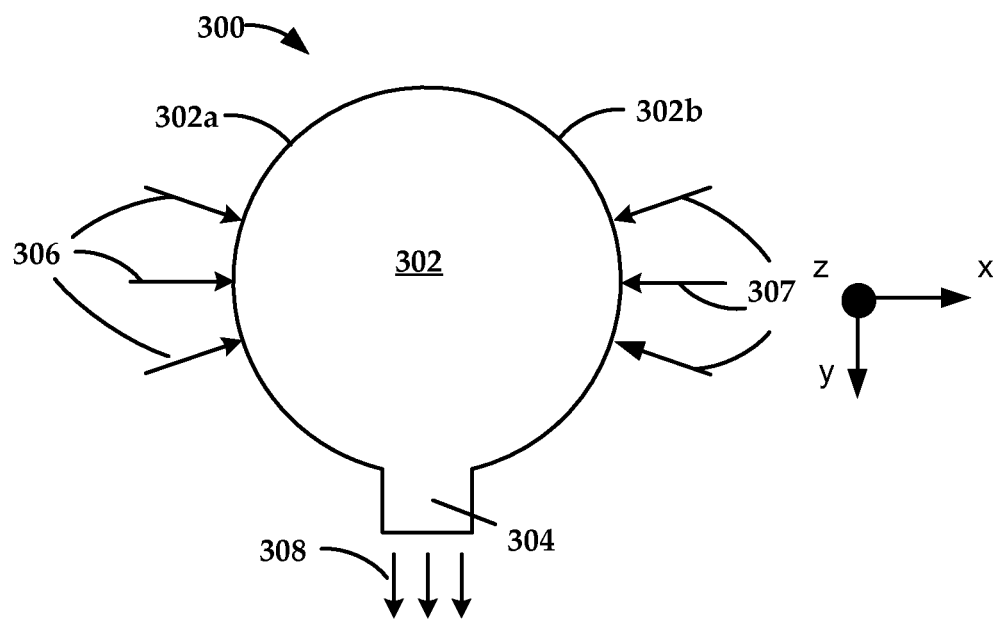
FIG. 3 is a plan view of a typical near-field transducer.

In the following drawings for near-field transducers, the size of the enlarged region is much larger than that of the flared region or peg region. The figures are modified in relative size to fit on the paper. FIG. 3 is a plan view of an example of the near-field transducer used in HAMR magnetic recording systems and apparatuses. NFT 300 includes enlarged circular disc region 302 and peg region 304 that is disposed proximate the media-facing surface. NFT 300 is formed from a thin film of plasmonic material (e.g., gold, silver, copper, aluminum, or alloys thereof) on a substrate parallel plane of the slider proximate the write pole. Typically, the substrate can include silicon, aluminum titanium carbide, or any other substance having low conductivity. The light delivery waveguide is shaped to direct light to a focal point and delivers light 306 and 307 to first and second sides 302a and 302b of NFT 300 which is positioned adjacent to the focal point. Light 306 and 307 causes plasmon resonance on the surface of NFT 300, and plasmons 308 generated by this resonance are emitted from peg region 304 towards the data storage media where they are absorbed to create a hotspot.

Temperature increase inside the peg region of NFTs is a challenge in HAMR write heads. It would be desirable to design an NFT that has less of a temperature increase than NFTs known in the art. To reduce the temperature of the peg region of an NFT the thermal resistance of the peg should be reduced. However, the thermal resistance of the peg must also be reduced without substantially compromising the transducer performance (i.e. coupling efficiency). The coupling efficiency is the percentage of energy absorbed into the media surface, divided by the energy input at the incident plane of the PSIM from the energy source.

Also, related to the temperature increase is the thermal resistance. Thermal resistance of an object is directly proportional to the length of the object and inversely proportional to the cross-sectional area and thermal conductivity of the object (Fourier's Law). A typical material for an NFT is gold which has good mechanical and optical/plasmonic properties compared to other materials. Varying the NFT material may not substantially increase the thermal conductivity. Therefore, other means are required for reducing the thermal resistance of the peg region. In one aspect, to minimize thermal resistance the length of the peg region may be decreased. In another aspect, to minimize thermal resistance the cross-sectional area of the peg may also be increased. However, the cross-sectional area of the peg at the air-bearing surface, nearest the recording media, is dictated by the parameters required for magnetic recording. Additionally, specific wavelength of light from the laser diode dictates the size of the enlarged region (disc) of the NFT and the peg length in order to get optimal (maximum) coupling efficiency of the laser light to the NFT. As a result, the disclosed approach to an NFT with lower thermal resistance is to use an NFT with a flared region as shown in FIGS. 4A and 4B.

Figure 4A:
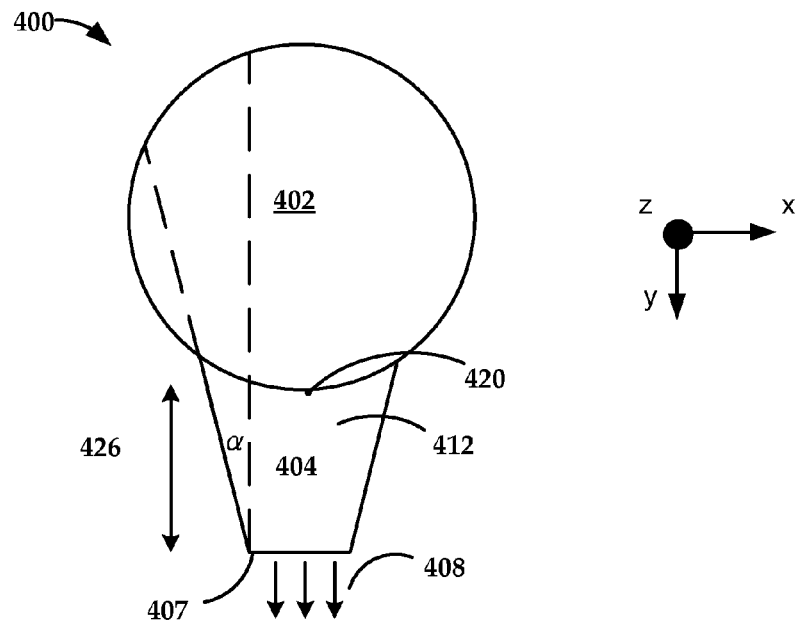
FIG. 4A is a plan view of an embodiment of a disclosed near-field transducer that has a flared region.
Figure 4B:
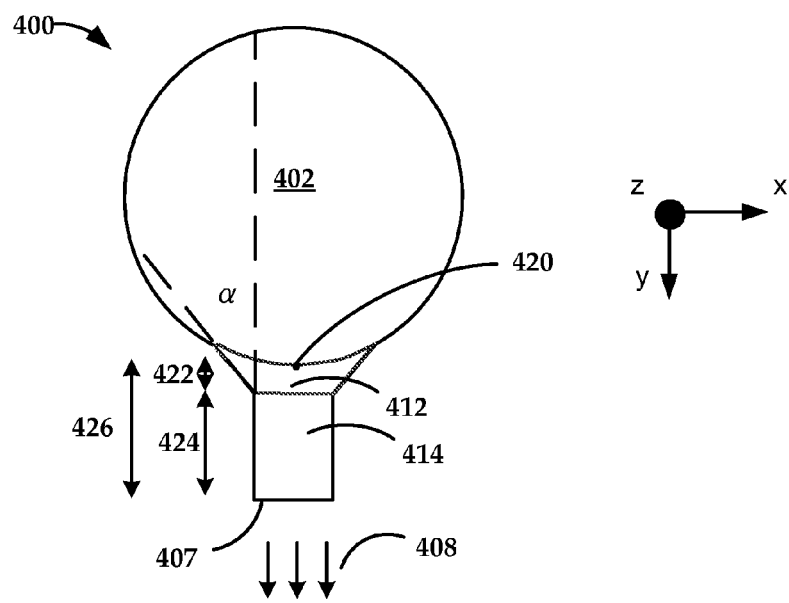
FIG. 4B is a plan view of an embodiment of a disclosed near-field transducer that has a peg extending from a flared region.

FIG. 4A is a plan view of an embodiment of a disclosed near-field transducer used in a HAMR magnetic recording apparatus or system. NFT 400 includes enlarged region 402 at an input end, in contact with flared region 412 at break point 420. Flared region 412 narrows to output end 407 disposed adjacent to the media-facing surface. NFT 400 is formed from a thin film of plasmonic material (e.g., gold, silver, copper, aluminum, or an alloy thereof) on a substrate parallel plane of the slider proximate the write pole.

Flared region 412, has flare angle, ($\alpha$), wherein ($\alpha$) is the angle between a reference position normal to output end 407 (or the air-bearing surface) and an outside edge of flare region 412. In FIG. 4A the flare angle, ($\alpha$), of peg region 404 is shown by the dotted lines indicating the angle. Further, peg region 404 directs energy 408 produced by plasmons at output end 407 that emanates towards the air-bearing surface of magnetic recording medium (not shown) in direction of plasmon energy arrows 408. Enlarged region 402 may comprise a variety of geometries and is not limited to a circular disc, as shown in FIG. 4A. For example, enlarged region 402 may have a circular, elliptical, rectangular, or triangular cross-section. Furthermore, each cross-section may include extended regions to create an even larger cross-sectional area. Flared region 412 defines a volume of plasmonic material that is larger than that of a typical NFT without a flared region (e.g., NFT 300 from FIG. 3). This larger volume of flared region 412 provides lower thermal resistance than in a typical NFT by providing a larger cross-sectional area that can act as a heat sink and direct more heat away from flared region 412.

In some embodiments, the flared region of the disclosed near-field transducers can include a peg region that extends from the break point to the output end and has a length (e.g., 426 from FIG. 4A) from about 10 nm to about 30 nm, from about 15 nm to about 25 nm, or about 20 nm. In some embodiments, the flare angle, $\alpha$, can make an angle of from about 15degrees to about 30 degrees from the normalized reference position. The flared region and the peg region, independently, may have a thickness of from about 20 nm to about 60 nm, from about 30 nm to about 45 nm, or even from about 35 nm (measured in the "z" direction). Further description of disclosed NFTs with flared pegs and methods of making them are disclosed, for example, in U.S. Publication No. 2014/0251948.

The disclosed near-field transducers can include a substrate which has been at least partially covered with a thin layer of plasmonic material. The substrate can comprise any material capable of supporting a thin layer of plasmonic material. Typical substrates include silicon wafers, inorganic and organic dielectrics, polymer dielectrics, glass, non-conductive metals and ceramics. Typical plasmonic materials include at least one of aluminum, silver, copper, gold, and alloys thereof. Gold is a typically used material due to its good mechanical properties, coupling efficiency and its ability to generate surface plasmons.

FIG. 4B is a plan view of another disclosed near-field transducer used in a HAMR magnetic recording apparatus or system. NFT 400 includes enlarged region 402, flared region 412, and peg region 414. Peg region 414 includes output end 407 disposed proximate the media-facing surface. NFT 400 is formed from a thin film of plasmonic material (e.g., gold, silver, copper, aluminum, or an alloy thereof) on a substrate parallel plane of the slider proximate the write pole (e.g., write pole 209 in FIG. 2). Flared region 412 has flare angle, (α), wherein (α) is the angle between a reference position normal to the output end of flared region 412 and an outside edge of flare region 412. In FIG. 4B the flare angle, a, of flare region 412 is shown by the dashed lines indicating the angle.

Peg region 414 directs energy 408 produced by NFT 400 at output end 407 towards the air-bearing surface of magnetic recording medium in direction of arrows 408. Enlarged region 402 may comprise a variety of geometries and is not limited to a circular disc, as shown in FIG. 4B. For example, enlarged region 402 may have a circular, elliptical, rectangular, or triangular cross-section. Furthermore, each cross-section may include extended regions to create an even larger cross-sectional area.

The NFTs with flared regions as shown in FIGS. 4A and 4B define a volume of plasmonic material that is larger than that of an NFT without a flared region. This larger volume provides lower thermal resistance between the enlarged region and the flared region than in a typical NFT without a flared region. By providing an NFT with larger cross-sectional area the thermal resistance of the NFT can be reduced and the larger area can act as a heat sink and direct more heat away from the output end.

In some embodiments, the disclosed near-field transducers can include a peg region that has a length (e.g., 426 from FIG. 4B) that is from about 10 nm to about 30 nm, from about 15 nm to about 25 nm, or about 20 nm in length. In some embodiments, the flare region may have a length (e.g., 422 from FIG. 4B) that can extend from about 10 nm to about 30 nm from the break point of the near-field transducer. In some embodiments, the peg region may have a length (e.g., 424 from FIG. 4B) that can extend from the output end of the flared region from about 10 nm to about 30 nm to the output of the peg region (e.g., 407). In some embodiments, the flare angle, a, can make an angle of from about 15 degrees to about 30 degrees from the normalized reference position. The peg can have a width (measured across the face of the peg) of from about 20 nm to about 60 nm, from about 30 nm to about 45 nm, or even from about 35 nm. The peg region may also have a thickness of from about 20 nm to about 60 nm.

Figure 5A:
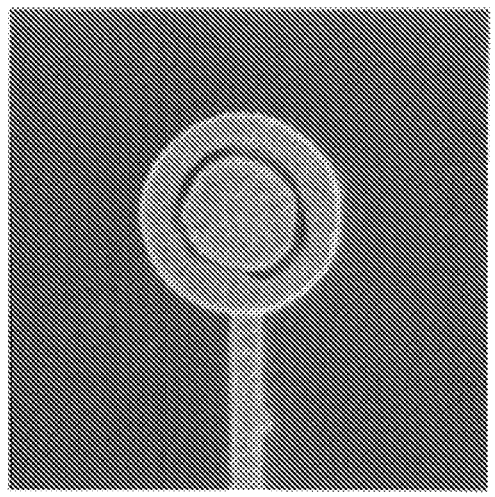
FIG. 5A is a photomicrographs of a typical near-field transducer.
Figure 5B:
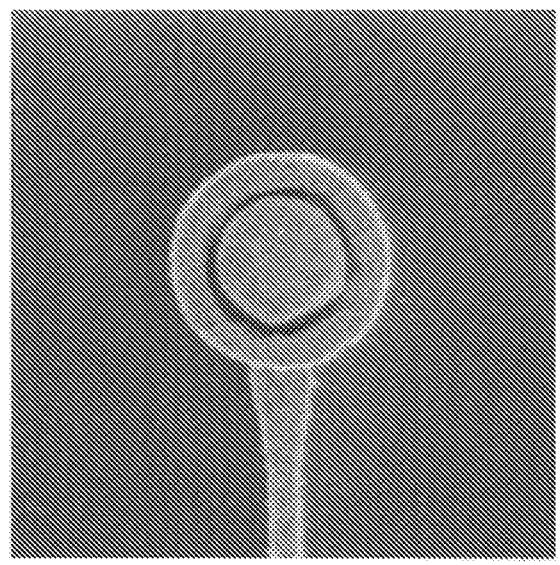
FIG. 5B is a photomicrograph of a disclosed near-field transducer with a flared peg.

FIGS. 5A and 5B are photomicrographs of near-field transducers made including peg regions of disclosed near-field transducers. In some cases, plasmonic near-field transducers can be made by using multiple steps or multiple masks, and may comprise at least two separate regions (e.g., enlarged region and peg region). Separate regions may also consist of different compositions. The compositions of each region may be selected from at least one of gold, silver, copper, aluminum, and alloys thereof. FIGS. 6A and 6B are photomicrographs of a disclosed near-field transducer showing flared region 610. FIG. 6B is an enlargement of the flared region 610 of FIG. 6A as shown by the arrow.

During the operation of the plasmonic near-field transducer, the plasmonic near-field transducer experiences a temperature rise. Modeling (finite element analysis of heat flow) has shown it is highest in the peg region of the near-field transducer. The models indicate that the electromagnetic field generated within the near-field transducer during the recording operation is highest within the peg region. Models show that the amplitude of the electromagnetic field is directly proportional to the energy absorption level. The disclosed plasmonic near-field transducers may include a flared region for cooling the NFT through improved heat dissipation from the peg region to the enlarged region.

A significant temperature rise within the peg region may create reliability issues in the life of HAMR heads. Reliability issues might include NFT corrosion, degradation of a protecting overcoat layer and subsequent write pole corrosion, weakening of mechanical properties of NFT, and melting. Modeling indicates that the temperature rise within the peg region may be much higher in comparison to the enlarged region of the NFT. To reduce the temperature of the peg region and to reduce the temperature gradient of near-field transducers, the thermal resistance between the peg region and the enlarged region should be reduced. In accordance with Fourier's law, the thermal resistance of an article is directly proportional to the length of that article. The thermal resistance of an article is also inversely proportional to the cross-sectional area and the thermal conductivity of that article. With respect to plasmonic near-field transducers useful in HAMR, the number of useful materials is limited. As a result, the thermal conductivity of the peg region is not easily altered by changing plasmonic materials. The thermal resistance of plasmonic near-field transducers can therefore altered by either reducing the length of the peg region or by increasing the cross-sectional area of the peg in a "lollipop" plasmonic near-field transducer. However, recording requirements for a certain track width must be taken into consideration. The track width may require a specific cross-sectional area of the peg at the air bearing surface (ABS). For example, specific wavelengths of laser light require a specific enlarged region size, as well as, a specific peg region length, in order to achieve maximum coupling efficiency.

In order to find the optimal electromagnetic and thermo-mechanical design for more thermally resistant plasmonic near-field transducers, various designs of the peg region have been studied in both, electromagnetic and thermo-mechanical models. FIG. 7 shows a series of schematic illustrations of NFTs having varying flared regions and, optionally, peg regions that were used for disclosed electromagnetic and thermo-mechanical modeling. All models were designed using a FePt magnetic media with approximately less than 10 nm spacing between the recording head and media. The NFT models included various sizes and shapes of flared regions with and without peg regions.

FIGS. 7A, 7D, and 7G are schematic illustrations of "lollipop" NFT designs that do not have a flared region and only include enlarged regions and peg regions that extend 10 nm, 20 nm, and 30 nm from the break point to the output end of the peg region. These designs were used as comparative designs. The NFT designs shown in FIGS. 7B, 7E, and 7H have flared regions that include flared regions 710 that are 10 nm in length as measured from the break point. The flared regions are 10 nm, 20 nm, and 30 nm respectively in length. The NFTs in FIGS. 7E and 7H include peg regions 715 that are 10 nm and 20 nm in length respectively and extend from the end of the flared region to output end of the peg region. The NFT in FIG. 7I includes peg region 715 that is 10 nm in length and extends from the end of flared region 710 to output end of the peg region.

For modeling the length of the flared regions was varied in length from about 10 nm to about 30 nm from the break point towards the output end. Peg regions, if present, extended from about 10 nm to about 20 nm from an end of the flared region towards the output end. Flare regions varied from about 10 nm to about 20 nm and began "flaring" approximately 10 nm and 20 nm away from the break point, or immediately after the break point. For modeling, the flare angle (e.g., (α) from FIG. 4A) for each flare region was held constant at about 18°. In some instances, the peg region was to be cut to achieve the appropriate peg region length. For example, a 10 nm peg with a flare region that began approximately 20 nm away from the break point was cut or lapped at about 10 nm away from the break point. The resulting cross-section of the cut flared region had a different cross-section from an uncut flared peg of the same approximate length. An NFT having a 10 nm peg with a 10 nm flare distance from the break point had a different cross-section than a 10 nm cut peg with a 20 nm flare distance from the break point.

The results from the modeling studies are provided in Tables 1-3 shown below:

TABLE 1

Coupling Efficiency Normalized (CE_norm) with respect to Baseline

| NFT Length (Flared Region + Peg Region) | Peg Region | 10 nm Flare Region | 20 nm Flare Region |
|---|---|---|---|
| 10 nm | 0.987 | 0.964 | 0.937* |
| 20 nm | 1.0 (baseline) | 1.015 | 0.992 |
| 30 nm | 0.579 | 0.620 | 0.672 |

*Flare cut from 20 nm in length to 10 nm in length resulting in larger cross-section at ABS.

First the electromechanical model (based upon Maxwell's equations) was used to determine the coupling efficiency of light energy (from a waveguide) directed to a focal point adjacent to plasmonic near-field transducers having various configurations as listed in Table 1 and diagrammed in FIGS. 7A-I. The coupling efficiencies are calculated energy output from the plasmonic near-field transducer divided by the energy input into the plasmonic near-field transducer. Table 1 shows the coupling efficiencies of various designs with the data normalized to a baseline. The results provided in Table 1 show that an introduction of a flared peg does not significantly affect the coupling efficiency (<4%), as long as the peg length is less or equal to 20 nm. In the case of the 20 nm peg length, and 10 nm flare length, the coupling efficiency has even been shown to improve. Table 2 displays the maximum change in temperature increase within the peg based upon the same modeling.

TABLE 2

Max Change in Temperature Increase within NFT (° K)

| Peg Length NFT Length (Flared Region + Peg Region) | Peg Region | 10 nm Flare Region | 20 nm Flare Region |
|---|---|---|---|
| 10 nm | 8.66 | 6.86 | 8.36* |
| 20 nm | 9.29 (baseline) | 9.04 | 8.75 |
| 30 nm | 8.36 | 8.28 | 8.23 |

*Flare cut from 20 nm in length to 10 nm in length resulting in larger cross-section at ABS.

In order to analyze temperature data and electromagnetic data of different peg designs simultaneously, the temperatures were scaled with the normalized values of the coupling efficiency, so that the near-field transducers effectively delivered the same amount of energy to the media. Results of the peg temperatures normalized with CE norm (coupling efficiency normalized temperatures) are shown below in Table 3.

TABLE 3

Steady State Change in Temperature Increase within Pegs Normalized to CE (° C.)

| Peg Length | Narrow Region | 10 nm Flare Region | 20 nm Flare Region |
|---|---|---|---|
| 10 nm | 8.77 | 7.11 | 8.92* |
| 20 nm | 9.29 (baseline) | 8.9 | 8.82 |
| 30 nm | 14.44 | 13.35 | 12.25 |

*Flare cut from 20 nm in length to 10 nm in length resulting in larger cross-section at ABS.

The data from Table 3 show that introducing the flare angle in the peg design may create a reduction in the temperature increase. The results of the flared peg designs showed a reduced temperature increase of the peg by about 5% to about 23%, without significantly affecting the coupling efficiency. In view of the models, for all peg lengths less than or equal to 20 nm the temperature increase within the peg was reduced. For the 30 nm long pegs, even though maximum temperature of the pegs, as shown in Table 2, was lower than the baseline design, the effective temperature change for the 30 nm long pegs was significantly increased by 30-50%. This significant temperature increase of the 30 nm long pegs was due to having severely compromised coupling efficiency as shown in Table 1.

In another aspect, a method of using a plasmonic near-field transducer is disclosed that includes delivering light to a transducer region via a waveguide. Disposed within proximity to the transducer region is an input end of a plasmonic near-field transducer that receives the light. The light is then passed through the plasmonic near-field transducer and is delivered as a surface plasmon-enhanced near-field radiation pattern proximate the output end of the plasmonic transducer. The plasmonic near-field transducer is positioned adjacent to a focal point. In some cases the focal point may be in reference to a location on a magnetic media. Recording to the magnetic media may require heating the magnetic media using the plasmon-enhanced near-field radiation directed to a focal point, while a recording pole located proximate to the plasmonic near-field at the air-bearing surface may be used to record data. In some cases, methods of cooling the plasmonic near-field transducer may be used to improve the performance of the plasmonic near-field transducer. In some embodiments, a dielectric material can be disposed between the recording pole and the plasmonic near-field transducer at the air-bearing surface.

Suitable dielectric materials can include metal oxides such as, for example, $Al_2O_3$, $Y_2O_3$ $HfO_2$ $MgO$, $SiO_2$, and $SiO_xN_y$ ($0<x<2$; $0<y<4/3$), or spin-on dielectrics such as spin on glasses (silicates, siloxanes, silsesquioxanes), doped glasses, and suspended nanoparticles. Organic spin-on dielectrics include polymers that can have dielectric properties and can include polyimides, benzocyclobutene, polyphenylquinoxalines, polysilazanes, fluoropolymers, and highly aromatic polymers. The use of dielectrics, particularly spin-on dielectrics is disclosed in U.S. Pat. No. 8,885,448.

All references and publications cited herein are expressly incorporated herein by reference in their entirety into this disclosure except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. An apparatus comprising:
a waveguide shaped to direct light having wavelengths on the order of 700-1550 nm to a focal point; and
a plasmonic near-field transducer positioned adjacent to the focal point, wherein the near-field transducer comprises an enlarged region at an input end and a flared region that narrows towards an output end, the enlarged region having a circular cross-section and the flared region in contact with the enlarged region,
wherein the plasmonic near-field transducer has a break point located on the enlarged region at a point closest to the output end of the flared region, and wherein the flared region extends from about 10 nm to about 30 nm from the break point towards the output end which is adjacent to an air-bearing surface.

2. An apparatus according to claim 1, wherein the plasmonic near-field transducer has flare angle of from about 15 degrees to about 30 degrees.

3. An apparatus according to claim 1, wherein the flared region has a thickness of from about 20 nm to about 60 nm.

4. An apparatus according to claim 1, wherein the plasmonic near-field transducer comprises at least one of gold, copper, silver, aluminum, or an alloy thereof.

5. An apparatus according to claim 4, wherein the plasmonic near-field transducer comprises gold.

6. An apparatus according to claim 1, wherein the plasmonic near-field transducer comprises at least two separate regions.

7. An apparatus according to claim 6, wherein each separate region consists of a different composition.

8. An apparatus according to claim 7, wherein the different compositions comprise gold, aluminum, silver, and copper.

9. An apparatus according to claim 1, wherein plasmonic near-field transducer has a coupling efficiency of greater than about 0.9.

10. An apparatus according to claim 1, wherein the plasmonic near-field transducer has a temperature rise of less than about 10° C. normalized to the coupling efficiency.

11. An apparatus according to claim 1, wherein a peg comprises a narrow region in contact with the output end of the flared region, the narrow region having an end adjacent to the air-bearing surface.

12. An apparatus comprising:
a waveguide shaped to direct light having wavelengths on the order of 700-1550 nm to a focal point; and
a plasmonic near-field transducer positioned adjacent to the focal point, wherein the near-field transducer comprises an enlarged region at an input end and a flared region that narrows towards an output end, the enlarged region having a circular cross-section and the flared region in contact with the enlarged region, wherein the plasmonic near-field transducer has a peg region that extends from the flared region to the output end,
wherein the plasmonic near-field transducer has a break point located on the enlarged region at a point closest to the output end of the flared region, and wherein the output end of the peg region is from about 10 nm to about 30 nm from the break point and the output end is adjacent to an air-bearing surface.

13. An apparatus according to claim 12, further comprising a peg region that extends from about 10 nm to about 20 nm from an end of the flared region towards the output end.

14. A method comprising:
delivering light having wavelengths on the order of 700-1550 nm to a magnetic transducer region via a waveguide;
receiving the light at a plasmonic near-field transducer having an output end and disposed in proximity to the magnetic transducer region; and
delivering a surface plasmon-enhanced near-field radiation pattern proximate the output end of the plasmonic transducer in response to receiving the light, wherein the near-field transducer comprises an enlarged region at an input end and a flared region in contact with the enlarged region at a break point, the enlarged region having a circular cross-section and the flared region extending from about 10 nm to about 30 nm from the break point towards the output end.

15. A method according to claim 14, further comprising cooling the plasmonic near-field transducer.

16. A method according to claim 14, further comprising recording to a magnetic media via a recording pole located proximate to the near-field plasmonic transducer at an air-bearing surface, wherein a dielectric material is disposed between the recording pole and the plasmonic near-field transducer at the air-bearing surface.

17. A method according to claim 14, wherein the near-field transducer comprises a peg in contact with the enlarged region at a flare angle and an end adjacent to an air-bearing surface.

* * * * *